United States Patent Office 3,357,804
Patented Dec. 12, 1967

3,357,804
PROCESS FOR PREPARING HALOSULFONYL ISOCYANATES
Rolf Appel, Bonn, Germany, assignor to Olin Mathieson Chemical Corporation, a corporation of Virginia
No Drawing. Filed Dec. 26, 1963, Ser. No. 333,753
Claims priority, application Germany, Oct. 29, 1963, O 9,749
3 Claims. (Cl. 23—357)

This invention relates to an improved method for preparing halosulfonyl isocyanates having the formula $XSO_2NCO$ in which X is chlorine or fluorine.

Chlorosulfonyl isocyanate has been prepared by Graf, Chem. Ber. 89, 1071 (1956) from sulfur trioxide and cyanogen chloride. Fluorosulfonyl isocyanate has been prepared by Jonas et al., Angew. Chem. 70, 572 (1958) from chlorosulfonyl isocyanate and sodium fluoride.

According to the present invention, fluorosulfonyl isocyanate is produced in excellent yields by the reaction of sulfuryl diisocyanate with fluorosulfonic acid in a molar ratio of 1:1 according to the following equation:

$$FSO_3H + SO_2(NCO)_2 \rightarrow FSO_2NCO + (HOSO_2NCO)$$

The process is carried out preferably without solvent and at temperatures of 100° to 170° C. Suitably the calculated amount of fluorosulfonic acid is added gradually to the sulfuryl diisocyanate. The readily volatile fluorosulfonyl isocyanate formed in the reaction is continuously distilled out and collected in a suitable receiver. It is contaminated by a little $SO_3$ and is suitably purified by fractional distillation. The residue in the reaction flask is a product containing C, S, N, H and O. The isocyanatosulfuric acid expected from the above equation is unstable and polymerizes with partial decarboxylation. Chlorosulfonic acid reacts analogously to fluorosulfonic acid to yield chlorosulfonyl isocyanate. In the reaction mixture, so long as the sulfuryl diisocyanate is maintained in excess of the stoichiometric 1:1 molar ratio, the halosulfonyl isocyanate can be distilled out.

The fluorosulfonic acid used in the process of this invention can be prepared according to Meyer, Z. anorg. allgem. Chem. 206, 25 (1932) and the sulfuryl diisocyanate according to DBP 940, 351 from cyanogen bromide and sulfur trioxide.

Example I

In a 250 ml. 2-necked flask fitted with dropping funnel and distilling head was placed 74 g. (0.5 mole) of sulfuryl diisocyanate which was heated in an oil bath at 140–150° C. During 3 hours 50 g. (0.5 mole) of fluorosulfonic acid was added dropwise. At the same time the fluorosulfonyl isocyanate was distilled out as formed. The receiver, cooled in ice-water, contained at the end of the addition 53 g. (85% of theory) of fluorosulfonyl isocyanate. To remove $SO_3$, the product was fractionated through an 80 cm. column at a reflux ratio of 1:50. B.P. 61.5° C./760 mm.

*Analysis.*—$CNO_3SF$ (125.0) Calc.: 9.6, C; 11.2, N; 25.6, S. Found: 9.7, C; 11.1, N; 25.6, S.

Example II

In a two-necked flask fitted with dropping funnel and distilling head, small portions of chlorosulfonic acid were added to boiling sulfuryl diisocyanate. The temperature was held so that no distillation occurred. A few minutes after each addition, the apparatus was evacuated and a colorless liquid distilled into the receiver. This distillate was fractionated through a Widmer column yielding a liquid boiling at 105° C. It was identified by analysis and molecular weight as chlorosulfonyl isocyanate.

What is claimed is:
1. The method of preparing a halosulfonyl isocyanate having the formula $XSO_2NCO$ wherein X is selected from the group consisting of chlorine and fluorine by heating a mixture of sulfuryl diisocyanate and halosulfonic acid in which the molar ratio of sulfuryl diisocyanate to halosulfonic acid is maintained in excess of 1:1 at 100° to 170° C., and distilling the said halosulfonyl isocyanate from the said mixture.
2. The method of preparing fluorosulfonyl isocyanate by heating a mixture in which is maintained a molar proportion in excess of 1:1 of sulfuryl diisocyanate and fluorosulfonic acid at 100° to 170° C. and distilling said fluorosulfonyl isocyanate from said mixture.
3. The method of preparing chlorosulfonyl isocyanate by maintaining liquid sulfuryl diisocyanate at a temperature of 100° to 170° C., continuously adding chlorosulfonic acid to said sulfuryl diisocyanate, maintaining a molar proportion of sulfuryl diisocyanate to chlorosulfonic acid in excess of 1:1 and continuously distilling said chlorosulfonyl isocyanate from said liquid.

References Cited

FOREIGN PATENTS

| | | |
|---|---|---|
| 940,351 | 3/1956 | Germany. |
| 1,152,093 | 7/1963 | Germany. |

OTHER REFERENCES

Appel et al.: "Berichte," vol. 95, pp. 1753–1755 (July 1962).

MILTON WEISSMAN, *Primary Examiner.*